Nov. 26, 1940.  D. A. MEEKER  2,223,260

COFFEE MILL

Filed July 2, 1937  4 Sheets-Sheet 1

Inventor
David A. Meeker
Marechal & Noe
Attorneys

Nov. 26, 1940.　　　D. A. MEEKER　　　2,223,260
COFFEE MILL
Filed July 2, 1937　　　4 Sheets-Sheet 2
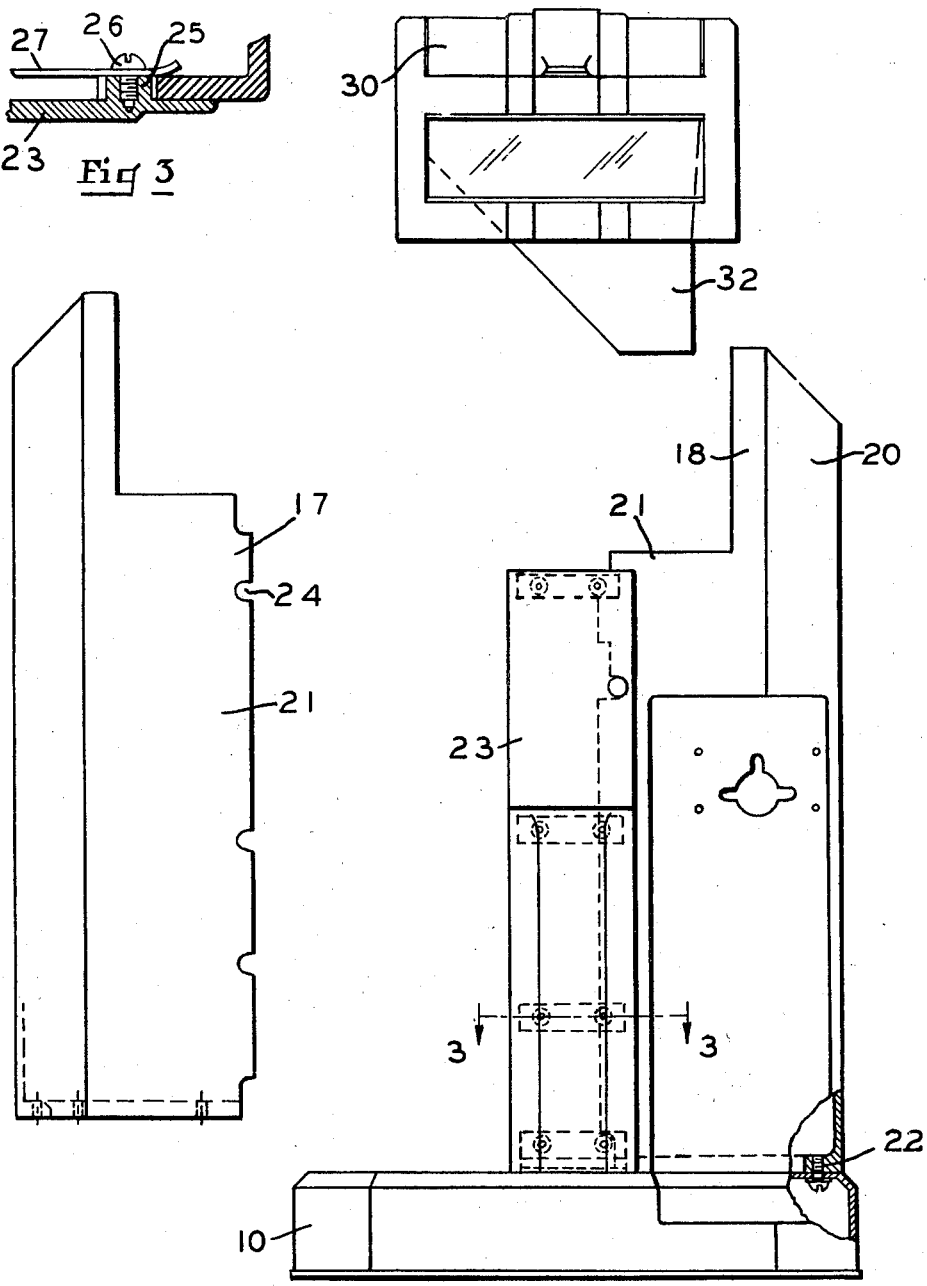

Nov. 26, 1940.　　　　D. A. MEEKER　　　　2,223,260
COFFEE MILL
Filed July 2, 1937　　　　4 Sheets-Sheet 3
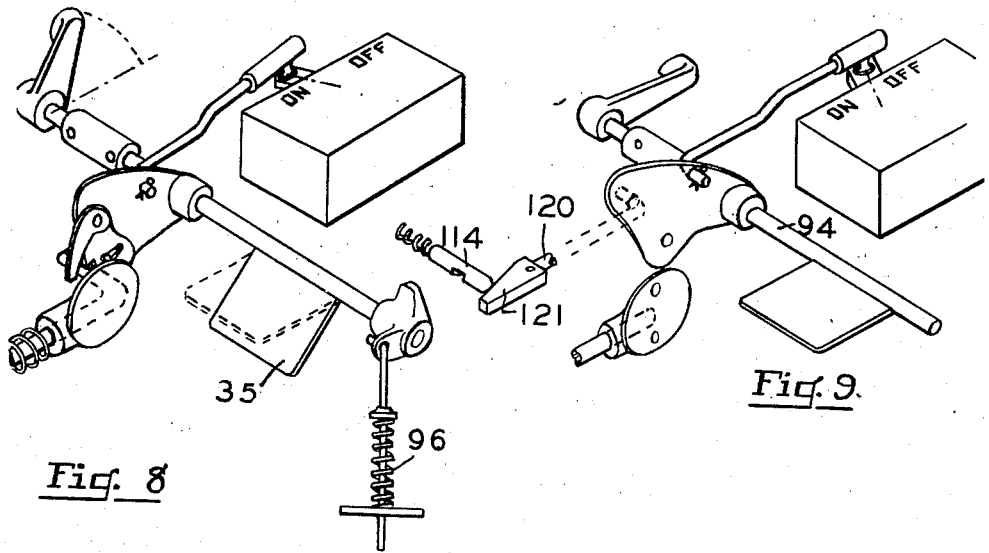
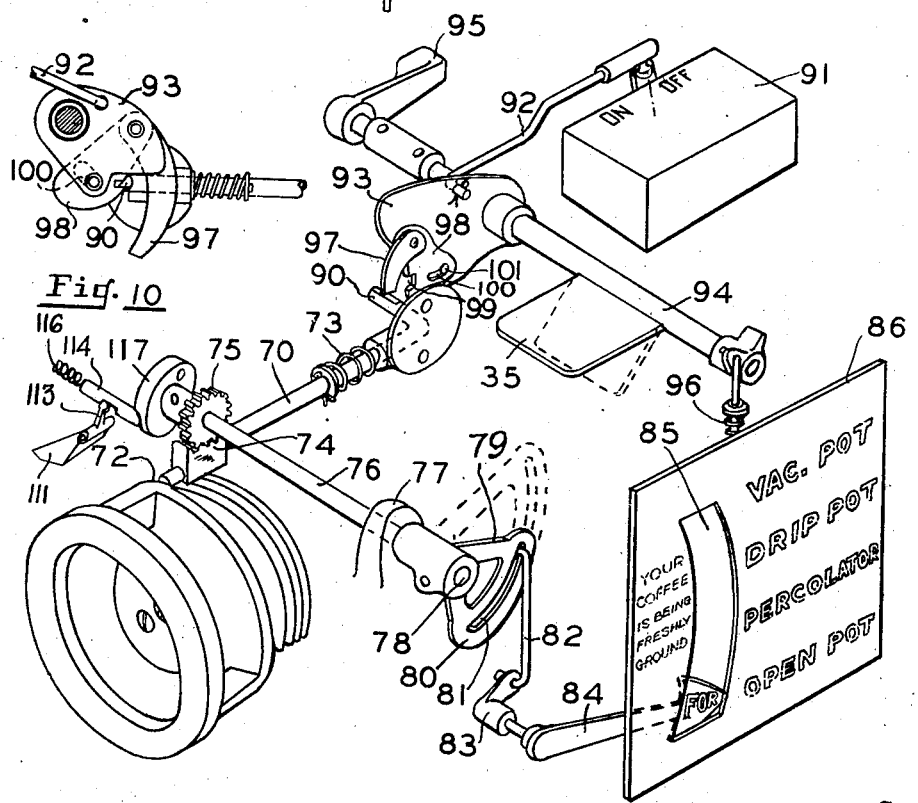
Inventor
David A. Meeker
Marechal & Noe
Attorneys Nov. 26, 1940.  D. A. MEEKER  2,223,260
COFFEE MILL
Filed July 2, 1937  4 Sheets-Sheet 4
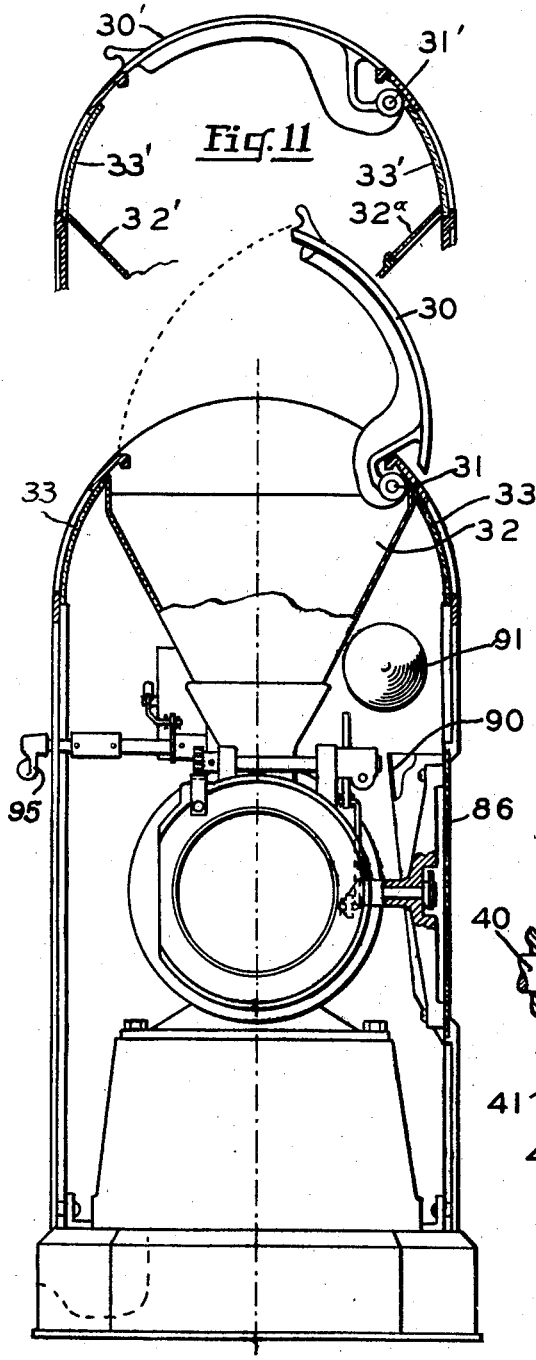
Fig. 11
Fig. 4
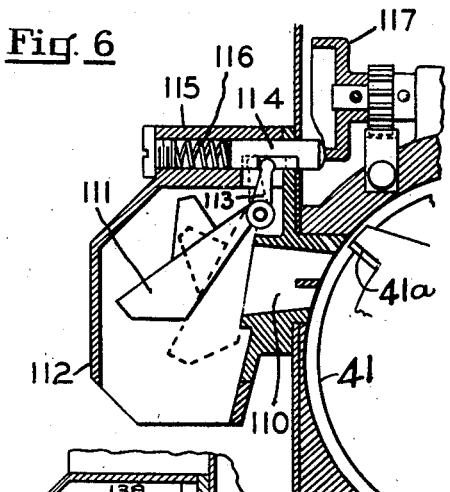
Fig. 6
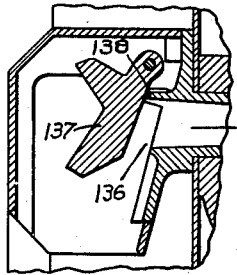
Fig. 14
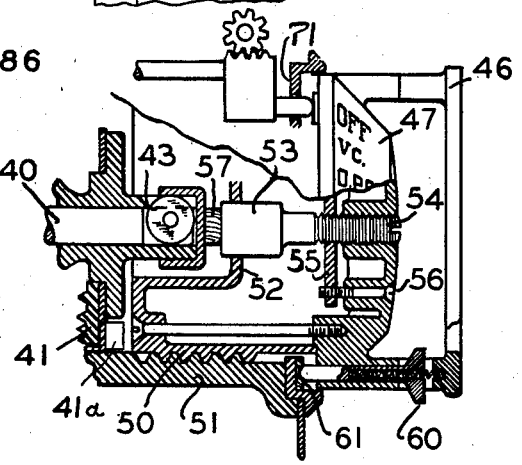
Fig. 5
Inventor
David A. Meeker
Marechal & Noe
Attorneys Patented Nov. 26, 1940

2,223,260

UNITED STATES PATENT OFFICE 2,223,260

COFFEE MILL

David A. Meeker, Troy, Ohio, assignor to The Hobart Manufacturing Company, Troy, Ohio, a corporation of Ohio Application July 2, 1937, Serial No. 151,696

13 Claims. (Cl. 83—18)

This invention relates to food handling apparatus and more particularly to mills for grinding coffee and the like.

Several different methods of making coffee are known and in general use and in order to secure the most satisfactory results in each case it is desirable that the coffee be ground to a predetermined degree of fineness. For example, coffee should be quite coarsely ground for use in the open pot method, and should be more finely ground for the drip and the like methods Coffee mills as used in retail stores have been provided with means for regulating the grade or fineness of the grind, but it has often occurred, particularly during rush periods, that an order or a series of orders are filled without adjusting the setting of the coffee mill. Thus the coffee is not ground with the proper characteristics for the particular customer's use.

It is accordingly the principal object of the present invention to provide a coffee mill adapted to grind coffee to a predetermined uniform condition into a receptacle.

It is also an object to provide a coffee mill adapted to grind to a predetermined grade or fineness and to discharge the ground coffee completely therefrom as a homogeneous ground product of the fineness desired.

It is also an object to provide a coffee mill in which the coffee during its discharge is subjected to a confining action in a simple and effective manner to secure discharge of a homogeneous ground product.

It is still another object to provide such a coffee mill in which the mill is substantially cleared of ground material at the end of each grinding operation so that there will be a minimum quantity of coffee carried over from one grind to the next.

Other objects and advantages will be apparent from the following description, the accompanying drawings, and the appended claims.

In the drawings,

Fig. 2 is an elevational view of the casing or housing structure with the several parts thereof separated;

Fig. 3 is a horizontal detail sectional view on the line 3—3 of Fig. 2;

Fig. 4 is a sectional view through the mill looking toward the end, with the grade selector mechanism being removed from operative position to more clearly show the structure of the mechanism;

Fig. 5 is a view partially in elevation and partially in vertical section showing the grade selector mechanism;

Fig. 6 is a vertical sectional view showing the means for controlling the discharging of ground material from the mill;

Fig. 7 is a view in perspective showing the construction of mechanism which provides for giving visual indication to the customer of the condition of the mill, and of interlock mechanism providing for predetermined sequence in operations;

Fig. 8 is a similar view of a portion of the interlock mechanism in a different position;

Fig. 9 is a view in perspective of a modified control mechanism;

Fig. 10 is a vertical detail sectional view of a portion of the interlock mechanism in interlocking position;

Fig. 11 is a fragmentary vertical sectional view corresponding to Fig. 4 of a somewhat modified construction;

Fig. 14 is a sectional view of another modified construction of discharge outlet.

Figure 1:
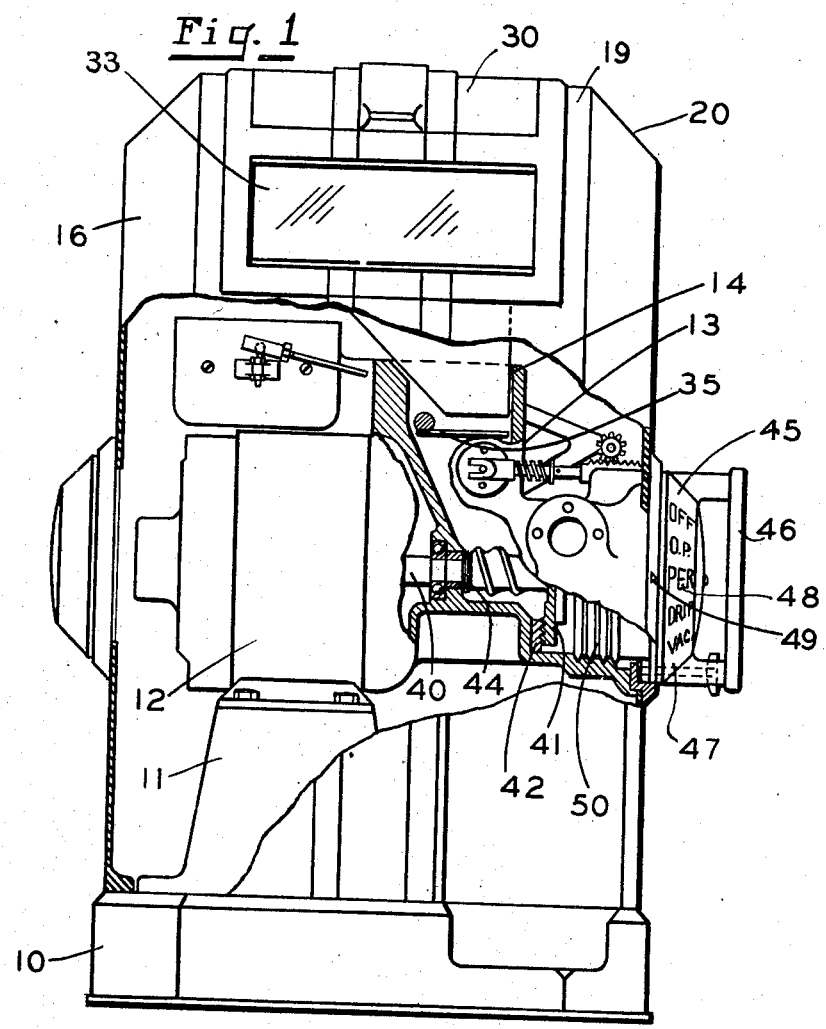
Fig. 1 is a view in elevation with certain parts being broken away of a coffee mill constructed in accordance with the present invention.

This application contains subject matter divided out from copending applications Serial No. 739,603, filed August 13, 1934, now Patent 2,090,634, and Serial No. 62,967, filed February 8, 1936, now Patent 2,217,069, assigned to the same assignee as this application, and is in part a continuation thereof.

Referring to the drawings, which disclose a preferred embodiment of the invention, there is shown at 10 a base member of suitable construction such as a die casting of aluminum or the like, upon which there is mounted an upstanding pedestal portion 11 providing a mounting for the driving motor 12. The motor supports a projecting grinder or burr casing 13 extending from one side thereof and having an upwardly opening portion 14 adapted to receive the coffee or like material to be ground.

The motor and grinding mechanism is enclosed within a suitable housing 16 which is preferably constructed in the following manner. The housing comprises a pair of molded end and side wall sections 17, 18, formed from a phenolic condensation material. These housing sections are provided with a curved top portion 19, having beveled end portions 20, and laterally extending side wall portions 21, extending toward each other. The two housing sections are fastened to the base by means of bolts 22, and are further held in assembled position by means of a metal plate 23 which is positioned in vertical arrangement along the wall portions 21, and is provided with means for receiving and retaining the adjacent wall portions of the two housing sections. For this purpose the wall sections are notched as shown at 24 in corresponding positions, and the plate 23 is provided with bosses 25 formed on its inner face which are suitably tapped to receive screws 26 which serve to removably hold flexible strips 27 in interengaged relationship with the walls 21 as shown. The outer edge of the flexible member 27 is bent as shown in Fig. 3 to provide for the interfitting of the adjacent wall sections thereinto, this construction providing for yieldably retaining these wall portions in place, but permitting the separation thereof when desired for removing the housing section from the mill.

At the top of the housing sections is positioned a cover member 30 which is suitably pivoted at 31 to a hopper structure 32, the outer contour of the cover section 30 preferably being such that when in closed position, it conforms generally to the curving portion 19 of the housing. The cover may be opened as shown to provide for the filling of the hopper with the coffee or other material to be ground. It may also be provided with a translucent opening 33 on the front or customer's side, as shown in Fig. 4, upon which light is cast from a suitable source within the casing. Advertising matter may be associated with this opening so that it will appear as an illuminated sign when the light is turned on and the mill is in operation.

Fig. 11 shows a modified construction in which the walls 32' of the hopper terminate below the openings 33'. In this construction the walls are preferably made somewhat higher and this construction is thus particularly desirable for larger sized mills. The hopper wall 32' is preferably provided with a light transmitting section 32a through which light is passed from the interior of the casing to the hopper where the illumination is made effective upon the coffee therein. Openings 33' are either transparent or translucent to provide for viewing the coffee contents of the hopper.

The cover and the hopper construction are preferably removable as a unit and are held in place by the cooperating portions of the two housing sections 17 and 18, the lower discharge end of the hopper when in assembled position extending into the opening 14 in the burr casing, to provide for supplying coffee thereinto.

A gate member 35 comprising a pivoted vane, is positioned within the entrance to the burr casing, and adapted to control the introduction of coffee from the hopper into the grinding mechanism itself.

The motor shaft 40 extends in overhanging relation, and is suitably journalled in a bearing provided in the casing 13, its overhanging end being provided with a rotary burr 41 which is adapted to cooperate with a stationary burr member 42 affixed to the burr casing itself. The rotary burr 41 is so mounted on a shaft as to be slidable thereon, as by means of a spline 43, to provide for its adjustment axially of the shaft with respect to the stationary burr 42, such spacing of the burrs providing for the control of the degree of fineness of grind of the coffee. A suitable spring means 44 mounted on the shaft 40 provides for normally urging the rotary burr away from the fixed burr.

Grade selector means is provided for controlling the postioning of the rotary burr, in the controlling of the fineness of grind. This grade selector mechanism comprises a control member 45 extending through an opening in the housing section 18 so that it is operable from the exterior of the mill. As shown this means may comprise a manually operable ring member 46 suitably mounted upon a beveled disk 47 providing for the ready operation by the store clerk in the adjustment of the fineness of grind. The beveled face 47 is preferably provided with a series of indications 48 arranged around its periphery, which are adapted to cooperate with a fixed index pointer 49 to indicate to the clerk the position of the grade selector means, and consequently the condition of grind for which the mill is adjusted.

Attached to the exterior grade selector control mechanism is a threaded cylindrical portion 50 extending inwardly of the housing and adapted to cooperate with a spiral groove arranged in a stationary part 51 of the frame, so that upon rotation of the grade selector means the entire mechanism is caused to move axially of the shaft of the motor. The cylindrical portion is constructed to provide a bearing at its inner end 52 for supporting an operating member 53 having threaded engagement at 54 with the outer disk 47. A locking bar 55 also threadedly engages the member 54, and is itself held against rotation by means of a pair of screws 56 passing through disk 47. Upon releasing the tension on these screws, the member 54 may be adjusted from the exterior of the mill to provide for zero adjustment; and when the locking screws are tightened, the member 54 will be retained in its predetermined adjusted position with respect to the grade selector parts. At its inner end the member 53 carries a bearing block 57 adapted to bear against the splined rotary burr 41, and to provide for axially adjusting the same in response to the rotation of the grade selector, to provide varying degrees of fineness of grind.

A spring pressed plunger 60 is positioned on the grade selector control means, and cooperates with a fixed ring 61 having a series of depressions therein, to provide for yieldingly retaining the grade selector in the predetermined grinding positions corresponding to different grades of fineness. Limit means may also be provided cooperating with such plunger 60, to prevent normal rotation of the grade selector beyond the predetermined grinding range, but permitting complete rotation of the grade selector mechanism for removal from the machine, upon manual retraction of this plunger.

Means are provided in accordance with this invention for visually indicating to the purchaser the particular grade of fineness for which the mill is set. This means comprises a shaft 70 which is supported and guided by means 71 which confines movement of the shaft to an axial movement. This shaft is arranged to engage, at its outer end, a cam surface 72 formed upon the inner face of the grade selector mechanism resilient means 73 providing for maintaining the shaft in contact with the cam surface. As the grade selector is rotated, it also moves inwardly in an axial direction, and causes a corresponding axial movement of the shaft 70 against the action of compression spring 73. The shaft carries a rack 74 which has interengagement with a pinion 75 mounted upon a right-angularly positioned shaft 76, this shaft being supported in suitable bearings 77. The overhanging end 78 of the shaft is provided with a bracket 79 having an arcuately arranged sector portion 80 provided with elongated slot 81. A link member 82 has a sliding engagement in this slot, and at its opposite end is adapted to operate a bell crank lever 83. The bell crank carries an indicating means such as the arrow 84, which is adapted to swing about its axis in response to the rotation of shaft 76. The visible portion of the arrow is viewed through an opening 85 of generally arcuate character formed in a plate 86 which is visible from the exterior of the mill. This plate also carries a series of stationary designations such as "Open Pot," "Drip Pot" and the like, indicative of the varying grades to which the coffee is to be ground. The movable arrow may also carry a designating word such as the word "For," and in its movement as controlled by the positioning of the grade selector, thereby points definitely to the particular setting of the mill, and assurance is provided the purchaser that the mill is set to grind in accordance with his particular wishes. The indicating mechanism being entirely protected within the interior of the device and inaccessible to the operator, it is assured that the device correctly indicates the setting of the mechanism at all times.

The elongated slot 81 permits of the adjustment of the grade selector and the associated mechanism into a non-grinding position, leaving the indicating device 84 in its lowermost position as illustrated. However upon the operation of the grade selector to any one of its several grinding positions, shaft 70 is cammed inwardly the proper corresponding amount and rack and pinion 74, 75 effect rotation of shaft 76. Segment 80 moves upwardly, and the link 82 contacts with the end of the arcuate slot, and bell crank 83 moves the arrow 84 into proper indicating position. It will be further noted that the grade selector mechanism is so constructed and arranged with respect to the indicator and interlock parts that it can be readily removed from assembled position without disturbing these parts; and likewise the grade selector can be easily reassembled with the assurance that it will provide proper interlock and indicating operations without requiring additional connections or adjustments. Furthermore the grade selector parts are removable and replaceable through an opening in the housing so that no change of parts or housing structure is required. In addition all parts for feeding ground and unground coffee during the grinding operation, and when disassembled for repair, etc., are closed from the space within the housing to thus insure keeping all operating parts within the housing free from ground coffee, dust, etc.

Means are preferably provided for effecting illumination of this indicating device, and for this purpose the plate 86 may, if desired, be made of translucent material, and may be backed by means of an upwardly sloping reflector member 90, spaced somewhat from the plate 86, in conjunction with a light source 91. These parts are positioned, as illustrated in Fig. 4, to provide for casting an effective quantity of light upon the translucent plate, the reflector further serving to concentrate the light rays upon the plate. Furthermore the arrow may also be made of translucent material if desired, in order to give a corresponding appearance when viewed from the exterior. Preferably the light source 91 is controlled by or in accordance with the position of the motor switch, so that simultaneously with the closing of the motor switch, and the beginning of the operation of the mill, the indicating device will be illuminated. The same light source may serve to illuminate the openings 33, 33', and 32a.

In the merchandising of coffee in retail stores, although adjustable grinding devices have been provided, it has sometimes been found that the clerks failed to ascertain the wishes of the individual customer and to adjust the setting of the mill accordingly. The indicating means just described makes it easy for the customer to see that the mill is properly adjusted and that the coffee is being correctly ground. And in conjunction with such indicating means, the present invention provides means for requiring an adjustment of the grade selector for each operation of the mill, and for preventing the operation of the mill until after the grade selector has been adjusted to a predetermined grinding position. An operation of the grade selector means to a definite grinding position being required, and the actual position of adjustment being clearly indicated to the customer, there is more assurance that the clerk or operator will ascertain the wishes of the individual customer and adjust the mill accordingly. This means includes the shaft 70 previously described, which at its inner end is provided with a right-angularly extending portion 90 serving as an interlock member. The portion 90 is preferably wedge-shaped in cross section with the apex of the wedge extending toward the cooperating interlock member. The motor switch is shown at 91, and is connected by means of link 92 to a plate 93 fastened to cross shaft 94, suitably supported on the frame of the machine. The shaft 94 extends through the casing of the machine and is provided with a manual control handle 95. Means such as spring 96 serves to urge the shaft in the direction of rotation which will cause the switch to be moved to off position. The shaft also carries the gate member 35 for controlling the admission of coffee from the hopper into the grinding chamber, the arrangement of the gate and associated parts being such that the gate is closed when the motor switch is turned to off position, and vice versa.

Plate 93 is provided with a pair of pendant members 97 and 98, both of these members being pivoted to the plate 93. The interlock member 90 is movable toward and away from the pendants, such movement being controlled by the axial adjustment of shaft 70 in accordance with the setting of the grade selector, as previously described. The pendant 97 extends downwardly and directly overlies the interlock member 90 when such member is in its outermost position, corresponding to the non-grinding condition or setting of the grade selector. In such position when it is attempted to lift handle 95 to move the switch from off to on position, and open the gate, pendant 97 strikes the interlock member and prevents such movement until the grade selector has been moved from its completely open or non-grinding position, into one of its several grinding positions. In any of the grinding positions the shaft 70 is moved inwardly sufficiently so that interlock member 90 passes under and clears pendant 97 permitting the control handle 95 to be lifted to start the motor, and open the gate to admit coffee to be ground.

The other pendant member 98 is provided with a notch 99 and is also slotted at 100 in an arcuate manner, through which slot extends the pin 101 fixed to the plate 93, permitting a predetermined limited movement of the pendant 98 on its supporting plate. This construction is such that when the grade selector is adjusted to any grinding position, with the switch in off position, and the switch subsequently turned to on position to effect starting of the mill, the edge of interlock member 90 will engage in slot 99. By reason of the pivoting of pendant member 98 on the plate 93, there occurs a locking action of the member 90 in slot 99 following their engagement, such action preventing return of the handle 95 and associated parts to the off position. This pivoting of the pendant also provides for establishing the interlocking engagement in all of the positions of member 90 corresponding to the several grinding positions of the grade selector, the pendant contacting the interlock member and thereafter moving on its support to the extent necessary, as the switch is being closed. Engagement and subsequent interlocking is facilitated by the wedge shaped construction of member 90. As shown in Fig. 10 the lower surface of member 90 is substantially horizontal and cooperates with the lower surface of slot 99. The upper surface of member 90 slopes at such an angle that the member will readily engage slot 99 at all relative positions of the parts, and remain in engagement until withdrawal of member 90. Thus the mill will continue to operate and cannot be shut off until the grade selector is returned to the non-grind position withdrawing member 90 from engagement in the slot. The locking action is thereby released and spring 96 returns handle 95 to off position, stopping the motor and closing the gate 35.

This mechanism thus requires that before the mill can be placed in operation, the grade selector be operated to a selected grinding position, proper indication thereof being given the customer. When the grinding is finished, the grade selector must be turned to the non-grind position and the mill is then stopped, in preparation for a subsequent cycle of operation in similar sequence.

Coffee is made up of a solid bean portion which is subject to being granulated, and a lighter chaff portion. During the grinding operation the chaff has a tendency to separate in flakes, and because of its different characteristics, it may assume an electrostatic charge which causes its segregation from the particles of ground bean. It is desirable however to provide a homogeneous mixture of ground chaff and bean, and to avoid this objectionable segregation of any of the constituents. Accordingly, the present invention provides a mixing chamber, located at the outlet side of the burrs, in which the ground materials are subjected to such pressure and rubbing contact as to disseminate the electrical charge, and during which the particles of the bean become coated with and disseminated through the particles of chaff. For this purpose there is provided a discharge chamber 110 of limited dimensions, into which the coffee is fed directly from the burrs. The walls of this chamber diverge outwardly as shown in order to facilitate the complete discharge of coffee therefrom. Over the end of the chamber is positioned a pivoted gate 111 which in its closed position, to which it is urged by gravity, serves to maintain the material within the chamber under a predetermined limited degree of pressure. Thus as the ground coffee is fed into the chamber from the grinding burrs under the action of wiper blades 41a, it forces the gate upward against the action of gravity, and the ground mass falls outwardly from the discharge connection 112. During its passage through the discharge chamber the particles of ground coffee are subjected to certain pressure, and undergo frictional and rubbing contact with each other and with the walls of the chamber. Such action serves to dissipate electrostatic charge and is effective in overcoming the tendency for the ground bean to separate from the chaff, providing for their homogeneous intermixture and discharge.

Following the termination of the grinding action there is normally a small quantity of coffee remaining within the chamber 110. In order to effect a complete discharge of this remaining portion so that the mill will be cleared for a subsequent operation, means are provided for lifting the gate 111. This may be done by a manual control (not shown) extending to the exterior of the casing so that the operator may raise the gate at any desired time. Preferably however means are provided for automatically lifting the gate at the termination of the grinding operation. For this purpose the gate is provided with an operating arm 113 extending upwardly into position to be actuated by means of a notched plunger 114 housed within a suitable casing 115 directly over the outlet connection 112. Spring means 116 tends to urge the plunger 114 in the direction to effect the raising of the gate. Means are provided for counteracting the spring, and preventing its control of the gate. This means comprises a cam 117 which is mounted upon the end of shaft 76, so that it is rotated in accordance with the positioning of the grade selector means. When the grade selector is adjusted to any one of its several grinding positions, the high point of the cam contacts the end of plunger 114, forcing the same back against the spring 116 to permit free play of the gate within the notched portion of the plunger, thereby permitting the gate to move under the action of gravity, and to control discharge of the coffee as above described. At the end of the grinding operation, when the grade selector is turned to its off or non-grind position, releasing the interlock mechanism previously described and simultaneously causing the motor to shut off, the low point of the cam is brought opposite plunger 114, and spring 116 then effects movement of the plunger outward in such direction as to cause the end of the notch to contact lever 113. This effects a lifting of the gate 111 from its closed position, and the final slowing down movement of the grinding burrs serves to completely discharge the remaining ground material within the discharge chamber 110. This assures a complete discharge for each operation of the mill, and further that the mill will not retain, for a subsequent grind, any portion of the coffee ground at a previous operation which might be of different fineness characteristics.

It is not essential to the control of the discharge chamber that the interlock means previously described be used. Fig. 9 shows a modification in which an alternative mechanism for operating the discharge gate is provided. As shown in Fig. 9, the motor switch control shaft 94 is provided with the plate 93 to which is attached the operating link 92 for the motor switch. This plate also carries an operating link 120 to the end of which is attached a camming block 121 adapted to cooperate with the end of the plunger member 114. The plunger 114 and the associated mechanism corresponds to that previously described so that it is apparent that a similar operation is effected. In the present case however upon the closing of the gate or the coordinated opening of the motor switch, followed by the slowing down of the motor, the gate mechanism is operated to effect the raising of the gate and to thereby permit the discharge of the small quantity of ground material contained in chamber 110, the gate remaining in closed or gravity operated position during the grinding operation and as long as the switch is in on position. Preferably the indicating mechanism as above described is also provided so that proper indication of the setting of the grade selector is afforded the operator.

Figure 13:
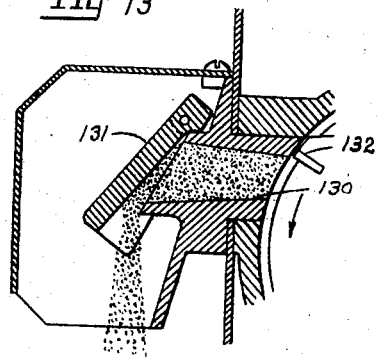
Fig. 13 is a sectional view on the line 13—13 of Fig. 12.
Figure 12:
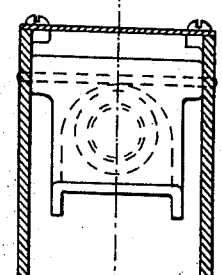
Fig. 12 is a vertical sectional view showing a modified construction of discharge outlet.

In Figs. 12 and 13 is shown a somewhat modified construction making use of a confining member over the discharge passage, without the provision of the means for lifting the member at the termination of the grinding operation. As shown, the pressure chamber 130 is formed with an outward taper to avoid undesired packing of the ground coffee therein during discharge. Means are provided for yieldingly confining the ground coffee in such chamber under pressure during discharge, this means for example comprising a door or weighted member 131 hingedly mounted at the end of the pressure chamber, tending to fall toward closed position. As the coffee is discharged from the burrs under the action of rotatable expelling members 132 which create a positive expelling pressure upon the ground material, it fills up the pressure chamber, and then forces the door 131 open, the coffee falling into a suitable receiving container. The weight and mounting of the door are suitably chosen to provide the desired confining and compressing action within the pressure chamber, the tapered character of the chamber preventing packing of the coffee therein. The provision of a pressure chamber filled with ground coffee also serves as a check against the blower action of the rotating burrs, preventing the tendency to blow fine particles of coffee out of the receiving container, a yielding confining member of the character described serving to prevent blowing of the fine particles of the ground coffee during the entire time the mill is in operation.

In Fig. 14 is shown a further modified form in which provision is made for completely clearing the mill at the termination of each grind without the necessity of effecting the lifting of the gate at the termination of the grinding action. In accordance therewith the lower portion of the wall of chamber 135 is milled away as shown at 136, the pivoted gate 137 thus normally resting against the wall portion 138 and in a clearance position providing a free discharge passage of limited extent. The functioning of this arrangement is as follows. During the grinding operation the rate of feed of ground material to the chamber from the grinding burrs is in excess of the rate at which the material can pass through the free discharge passage and a confining pressure is thus maintained within the chamber which results in the lifting of pivoted gate 137 to provide for the application of a predetermined confining pressure upon the ground coffee to secure discharge of a homogeneous ground product. At the end of the grinding operation, the rate of introduction of ground material into the chamber falls off, the gate thus being allowed to return toward normal position. When there is insufficient coffee to maintain a pressure within the chamber, the gate occupies the position shown, in which free discharge for the small remaining quantity of coffee is provided so that complete clearing of the mill is secured, such action being facilitated by the air currents set up by the rotating burrs.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coffee mill of the character described comprising grinding means for grinding coffee, means associated with said grinding means for discharging said ground coffee from said grinding means under pressure, a motor for operating said grinding means, a discharge outlet for receiving ground coffee directly from said grinding means, a member overlying said discharge outlet and yieldably confining the coffee within said outlet during operation of the mill while providing for continuous discharge of coffee therethrough under pressure, and means actuated concurrently with the deenergization of said motor for relieving the action of said confining means to provide for substantially complete discharge of ground material from said discharge outlet under the action of said pressure discharge means.

2. A coffee mill of the character described, comprising means for grinding the coffee, means for discharging the coffee from said grinding means under pressure and for creating an expelling pressure upon the ground coffee, a discharge chamber for receiving the ground coffee directly from said grinding means, said discharge chamber having a free discharge passage permanently provided therein of limited extent having a capacity less than the normal rate of supply of ground coffee thereto from said grinding means, and yielding means providing for enlargement of said free discharge passage during the normal grinding operation under the action of pressure created within said discharge chamber by said dispelling means, said free discharge passage providing for clearing of said discharge chamber at the termination of said grinding operation.

3. A coffee mill of the character described comprising means for grinding the coffee and for dispelling the same under pressure, a discharge chamber for receiving the ground coffee comprising particles of ground bean and chaff directly from said grinding means, a free discharge passage from said discharge chamber having a capacity less than the normal rate of feed of ground coffee into said discharge chamber, yielding means providing for enlargement of the passage from said discharge chamber upon creation of an expelling pressure within said chamber thereby choking the passage to prevent blowing of the coffee by air currents set up by said grinding means and securing discharge of a homogeneous ground product from the mill, said free discharge passage providing for clearance of the mill upon reduced rate of passage of ground material at the termination of the grinding operation, under the action of said air currents.

4. A coffee mill of the character described comprising means for grinding coffee, a discharge chamber for receiving the ground coffee from said grinding means, said chamber having a free discharge opening of limited extent, having a discharge capacity of less than the normal rate of supply of ground material from said grinding means, yielding confining means associated with said discharge chamber and adapted to be yieldably displaced under expelling pressure on the ground coffee created by the grinding means to enlarge the discharge opening and provide for discharge of a homogeneous ground product, said free discharge opening providing for clearing the discharge chamber at the termination of the grinding operation under the action of air currents set up by said grinding means.

5. A coffee mill of the character described comprising means for grinding coffee and discharging the same under pressure, a discharge chamber for receiving the ground coffee directly from said grinding means, grade selector means adjustable from a non-grinding position to a plurality of grinding positions for controlling the fineness of grind of said grinding means, means associated with said discharge chamber for restricting the passage of ground coffee therethrough to subject the coffee passing through said discharge chamber to a compressing action created by the pressure of said grinding means, and means operative upon adjustment of said grade selector means to said non-grinding position for releasing the action of said restricting means.

6. A coffee mill of the character described comprising means for grinding coffee, means carried by said grinding means for discharging the ground coffee under pressure, a hopper for holding a quantity of coffee to be ground and supplying the same to said grinding means, gate means for controlling the passage of coffee from said hopper into said grinding means, a discharge chamber for receiving the ground coffee directly from said grinding means, means associated with said discharge chamber for restricting the passage of coffee therethrough to create a pressure condition within said discharge chamber under the pressure developed by said grinding means, and means interconnecting said gate means and said restricting means and operative upon actuation of said gate means to terminate the feeding of coffee to said grinding means for withdrawing the action of said restricting means.

7. A coffee mill of the character described adapted for operating in a series of individual grinding operations comprising grinding means for grinding coffee including a rotary burr, adjustable grade selector means for selecting the fineness of grind, a short unobstructed discharge chamber for receiving ground coffee from said grinding means, wipers on the outer periphery of said rotary burr for expelling substantially all of the coffee as it is ground into and through said discharge chamber, yielding confining means associated with said discharge chamber for maintaining the ground coffee under pressure during its passage through said discharge chamber to provide for the discharge of a homogeneous ground product, and means interconnecting the grade selector means and said confining means for terminating the action of said yielding confining means to provide for the free discharge of the final quantity of ground coffee from said discharge chamber at the termination of each grind to provide for clearing the mill upon each grinding operation in preparation for a subsequent grinding operation at a selected grade of fineness.

8. A coffee mill of the character described comprising grinding means, means for controlling the grinding of coffee by said grinding means, a discharge chamber for receiving ground coffee from said grinding means, means for confining the coffee within said discharge chamber adapted to yield under pressure on said ground coffee supplied from said grinding means to provide for the discharge during operation of the mill of a homogeneous mixture of ground bean and chaff, means for withdrawing the action of said confining means, and means interconnecting said withdrawing means and said control means and operative when said control means is actuated to effect termination of the grinding of coffee for withdrawing the action of said confining means at the termination of the grinding operation to provide for complete discharge of the coffee from said mill.

9. A coffee mill of the character described, comprising a grinding chamber having a delivery passage opening therefrom, relatively rotatable grinding members within said chamber, means for feeding the material to be ground to pass into and between the grinding members and to be delivered therefrom into said chamber as ground particles and chaff having a tendency to separate, means acting immediately adjacent said grinding members and positioned to be immediately effective upon the ground particles and chaff delivered from the grinding members into said chamber and operated to impact said ground particles and chaff as delivered into the chamber and before objectionable separation thereof to impress a projecting force thereon and to project the admixed particles through said delivery passage, means effective at the delivery end of said passage and constructed to exert a predetermined resistance against the particles and chaff within said passage said resistance being sufficient to retard the flow of said particles and chaff within said passage to cause compacting of the admixed particles and chaff in said passage as a continuous operation into an air-current-resisting plug filling said passage and means effective to maintain said projecting force preponderant during operation to cause continuous flow of said compacted mass through said passage and delivery of the homogeneous intermixture of ground particles and chaff at a rate substantially equal to the rate of discharge of ground particles and chaff from between the grinding members.

10. A coffee mill of the character described, comprising a grinding chamber having a delivery passage opening therefrom and relatively rotatable grinding members within said chamber, means for feeding the material to be ground to pass into and between the grinding members and to be delivered therefrom into said chamber as ground particles and chaff having a tendency to separate, means acting immediately adjacent said grinding members and positioned to be immediately effective upon the ground particles and chaff delivered from the grinding members into said chamber and operated to impact said ground particles and chaff as delivered into the chamber and before objectionable separation thereof to impress a projecting force thereon and to project the admixed particles through said delivery passage, a gate member overlying the delivery end of said passage constructed to exert a predetermined limited resistance against the particles and chaff within said passage to cause compacting of the admixed particles and chaff projected into said passage as a continuous operation into an air-current-resisting plug filling said passage and mounted to automatically limit said resistance to maintain said projecting force preponderating during operation to cause flow of said compacted mass through said passage and delivery of the homogeneous intermixture of ground particles and chaff at a rate substantially equal to the rate of discharge of ground particles and chaff from between the grinding members.

11. The method in the grinding of coffee which tends to form chaff in addition to ground particles of coffee which consists in passing the material to be ground between relatively rotating grinding members to form ground particles and chaff having a tendency to separate, impressing a projecting force upon the ground particles and chaff before objectionable separation and as delivered from between the grinding members to project the admixed particles and chaff as delivered from the grinding members through a delivery passage, retarding the flow of said particles and chaff within said passage to cause compacting thereof in said passage into a mass filling said passage as an air-current-resistant plug and maintaining said projecting force preponderant to cause continuous flow of said compacted mass through said passage and delivery of the ground particles and chaff from the end of said passage as a homogeneous intermixture.

12. The method in the grinding of coffee which tends to form chaff in addition to ground particles of coffee which consists in passing the material to be ground between relatively rotating grinding members to form ground particles and chaff having a tendency to separate, impressing a projecting force upon the ground particles and chaff before objectionable separation and as delivered from between the grinding members to project the admixed particles and chaff as delivered from the grinding members through a delivery passage, impressing a retarding force upon the flow of said particles and chaff at the delivery end of said passage sufficient to cause said particles and chaff to compact in said passage under the action of the projecting force into an air-current-resisting plug filling said passage but said retarding force being limited to permit continuous flow of said compacted mass through said passage under said projecting force exerted thereon to cause continuous delivery of the homogeneous intermixture of ground particles and chaff from the delivery end of said passage at a delivery rate substantially equaling the rate of discharge of ground material from between the grinding members.

13. The method in the grinding of coffee which tends to form chaff in addition to ground particles of coffee which consists in passing the material to be ground between relatively rotating grinding members to form ground particles and chaff which are electrostatically charged and have a tendency to separate, impressing a projecting force upon the ground particles and chaff before objectionable separation and as delivered from between the grinding members to project the admixed particles and chaff as delivered from the grinding members through a delivery passage, retarding the flow of said particles and chaff within said passage to cause compacting thereof in said passage into a mass filling said passage and compacted within the confines of said passage to render the segregating tendency of said electrostatic charges ineffective and maintaining said projecting force preponderant to cause continuous flow of said compacted mass through said passage and delivery of the ground particles and chaff from the end of said passage as a homogeneous intermixture.

DAVID A. MEEKER.